(12) United States Patent
Kim

(10) Patent No.: US 7,399,253 B2
(45) Date of Patent: Jul. 15, 2008

(54) WASHER AND PLANETARY GEAR SET HAVING THE SAME

(75) Inventor: Jim Ho Kim, Hwasung-si (KR)

(73) Assignee: Hyundai Motor Company, Seoul (KR)

( * ) Notice: Subject to any disclaimer, the term of this patent is extended or adjusted under 35 U.S.C. 154(b) by 223 days.

(21) Appl. No.: 11/333,560

(22) Filed: Jan. 17, 2006

(65) Prior Publication Data

US 2007/0117675 A1 May 24, 2007

(30) Foreign Application Priority Data

Nov. 21, 2005  (KR) .................... 10-2005-0111387

(51) Int. Cl.
*F16H 57/08* (2006.01)
(52) U.S. Cl. .................... 475/331; 475/159; 475/348; 384/368; 384/420; 184/6.12
(58) Field of Classification Search ................ 475/159, 475/331, 348; 384/420, 424, 426, 368, 462, 384/474, 243, 371, 6.12; 184/6.12; 74/462, 74/468, 467
See application file for complete search history.

(56) References Cited

U.S. PATENT DOCUMENTS 1,786,565 A * 12/1930 Freeman .................... 384/368
4,480,492 A * 11/1984 Fujioka et al. ............... 74/467
4,776,237 A   10/1988 Premiski et al.
5,302,160 A *  4/1994 Fujioka ..................... 475/348
6,789,992 B2 * 9/2004 Horng et al. ................ 411/534

* cited by examiner

Primary Examiner—David D. Le
(74) Attorney, Agent, or Firm—Morgan Lewis & Bockius LLP

(57) ABSTRACT

A washer and a planetary gear set having the same, wherein the washer includes a first washer member and a second washer member. The first washer member is formed at a surface thereof with a plurality of first stepped portions each having a radially extending concave structure. The second washer member has a plurality of second stepped portions each having a radially extending convex structure facing the first washer member. As the second stepped portions are inserted into the first stepped portions, respectively, a plurality of oil flow holes are defined between the first stepped portions and the second stepped portions, thereby allowing lubricating oil to pass through the washer in a radial direction. With this configuration, the washer ensures the smooth supply of lubricating oil regardless of the rotating direction of a pinion gear.

8 Claims, 4 Drawing Sheets

WASHER AND PLANETARY GEAR SET HAVING THE SAME

CROSS-REFERENCE TO RELATED APPLICATION

This application claims priority to and the benefit of Korean Patent Application No. 10-2005-0111387 filed in the Korean Intellectual Property Office on Nov. 21, 2005, the entire contents of which are incorporated herein by reference.

BACKGROUND OF THE INVENTION

1. Field of the Invention

The present invention relates to a planetary gear device for use in an automatic transmission of an automobile, and more particularly, to a planetary gear device in which a washer is configured to ensure the lubricating oil can be smoothly supplied to frictional regions between a pinion gear and a carrier.

2. Description of the Related Art

Generally, a planetary gear device is used to change the speed of power output from an engine to thereby transmit the power to an output shaft. The planetary gear device includes a long-pinion gear, a plurality of short-pinion gears meshed with the outer circumference of the long-pinion gear, and a ring gear meshed with the outer circumference of the short-pinion gears. The center of the long-pinion and short-pinion gears is rotatably supported by means of carriers.

Typically, the carriers are mounted on a shaft with washers press fit on the shaft inside the carriers. The washers have oil passages. However, conventional washers typically allow for the flow of the lubricating oil only in one direction. They therefore suffer from a reduced supply of lubricating oil, and are difficult in commercialization due to their complicated assembling operations.

SUMMARY OF THE INVENTION

Embodiments of the present invention provide a planetary gear set and washer in which a pair of washer members is engaged with each other to define a plurality of oil flow holes therebetween, thereby ensuring the smooth supply of lubricating oil regardless of the rotating direction of a pinion gear.

In accordance with one exemplary embodiment of the present invention, a planetary gear set washer comprises a first washer member having a plurality of first stepped portions formed at a surface thereof, each first stepped portion having a radially extending concave structure, and a second washer member having a plurality of second stepped portions formed at a surface thereof facing the surface of the first washer member, each second stepped portion having a radially extending convex structure to be inserted into one of the first stepped portions. A plurality of oil flow holes are defined between the first stepped portions and the second stepped portions for allowing lubricating oil to pass through the first and second washer members in a radial direction.

The first stepped portions may be arched recesses equidistantly arranged at the surface of the first washer member in a circumferential direction, and the second stepped portions may be arched protrusions equidistantly arranged at the surface of the second washer member in a circumferential direction.

The second stepped portion may have a smaller arc length than the first stepped portion, so that the oil flow hole is defined between the first and second stepped portions.

In accordance with another exemplary embodiment of the present invention, a planetary gear set comprises a pinion gear, a hinge shaft to rotatably support the pinion gear, a pair of carriers fixed to opposite ends of the hinge shaft, and a pair of washers arranged between the respective carriers and the pinion, wherein each of the washers consists of a pair of washer members arranged face to face to define a plurality of radially-extending oil flow holes therebetween.

BRIEF DESCRIPTION OF THE DRAWINGS

Features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be explained with reference to the accompanying drawings.

Figure 1:
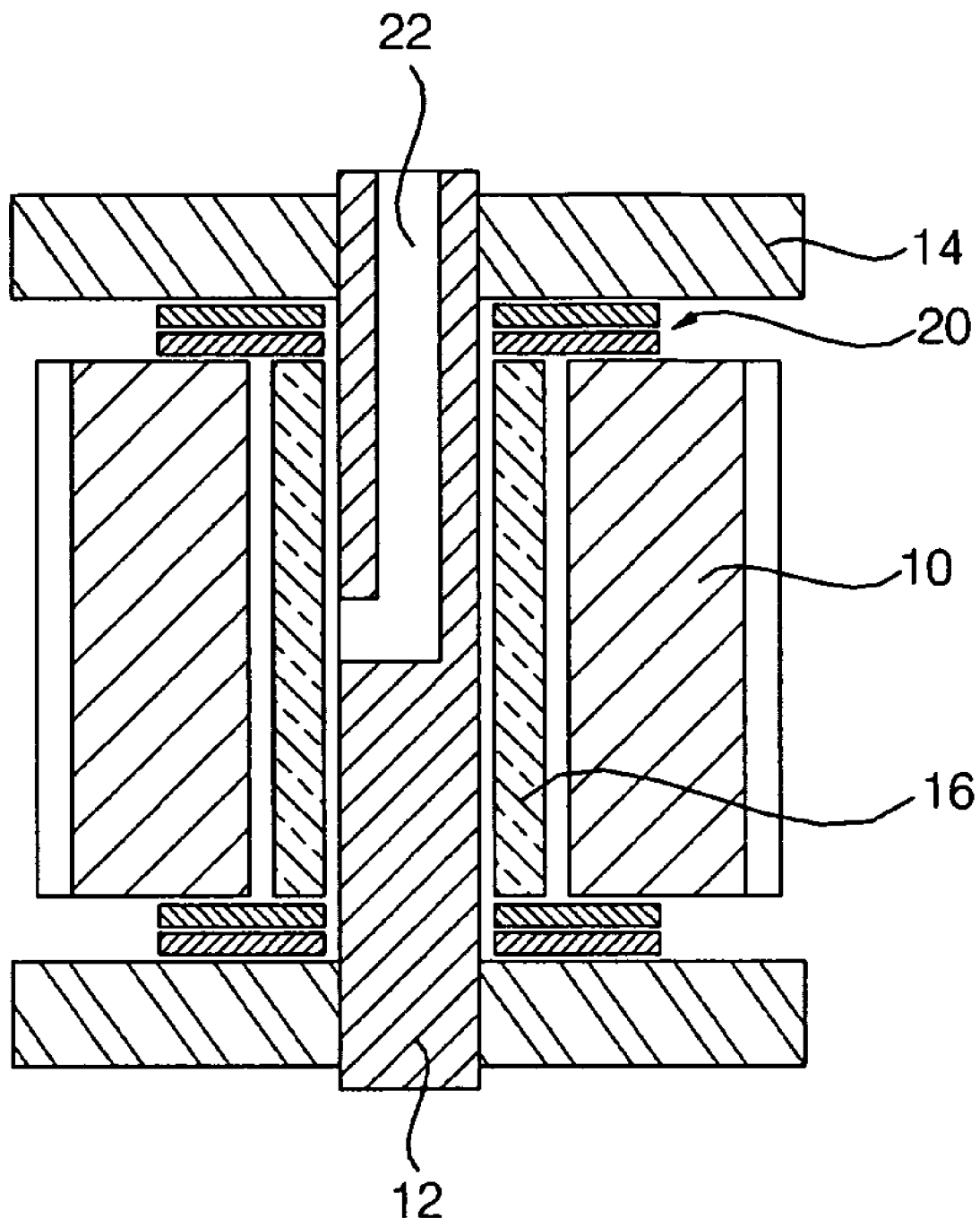
FIG. 1 is a partial sectional view of a planetary gear set according to the present invention.
Figure 2:
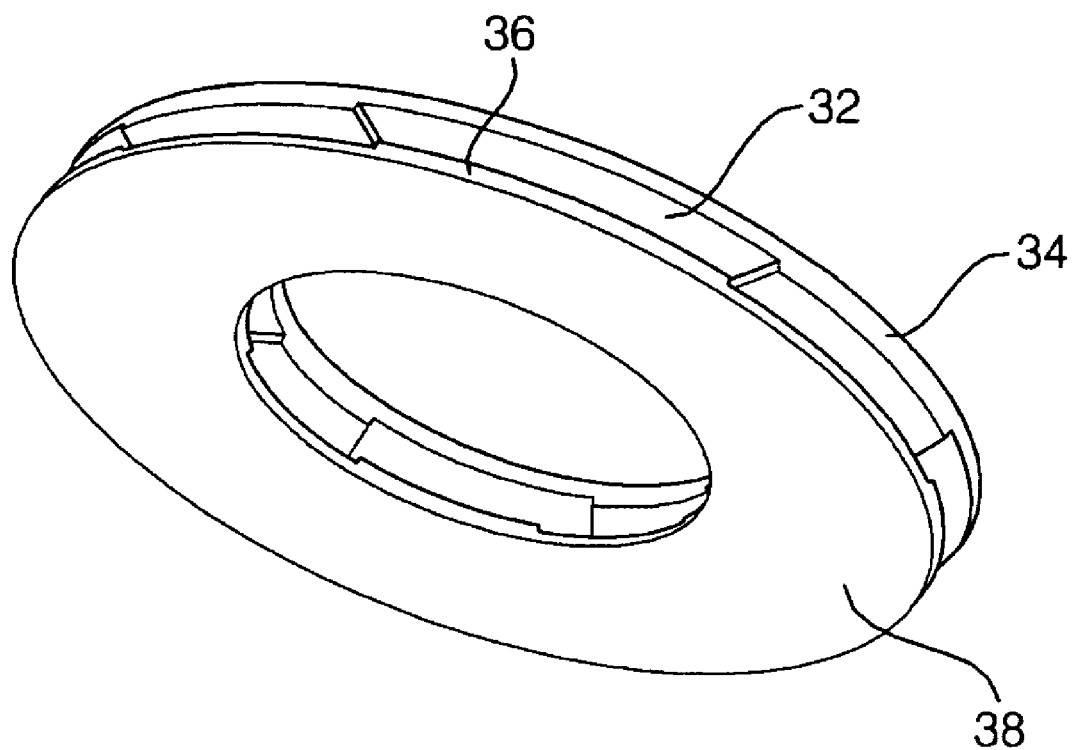
FIG. 2 is an assembled perspective view of a washer according to the present invention.
Figure 3:
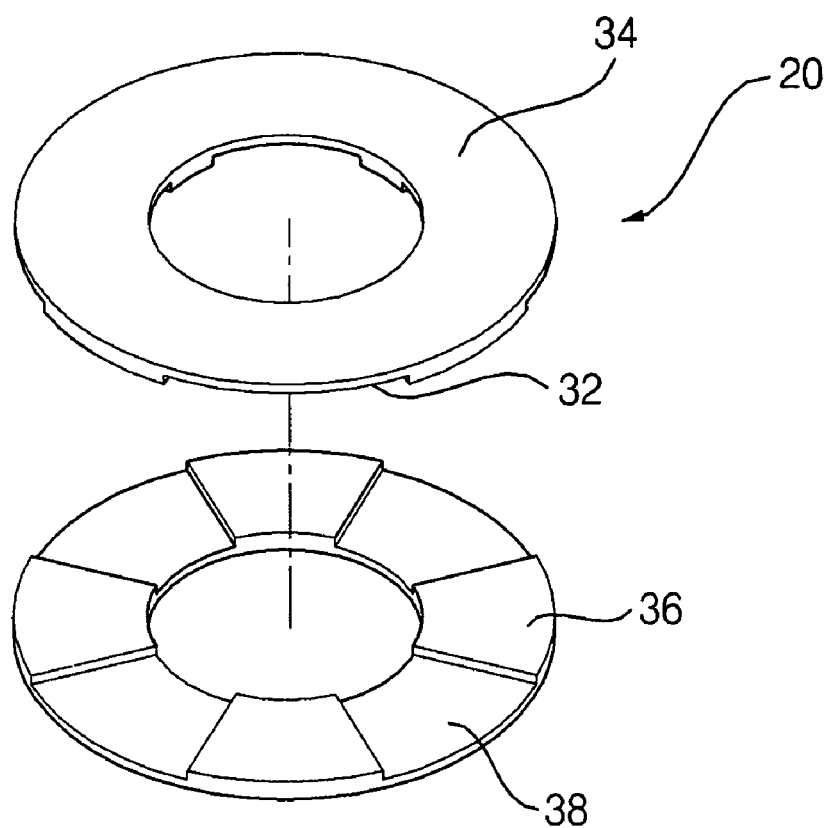
FIG. 3 is an exploded perspective view of the washer according to the present invention.
Figure 4:
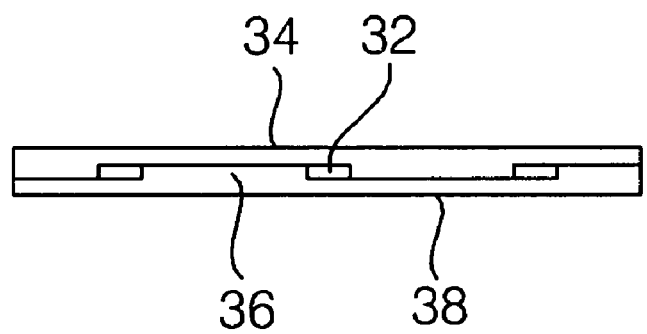
FIG. 4 is a side view of the washer according to the present invention.
Figure 5:
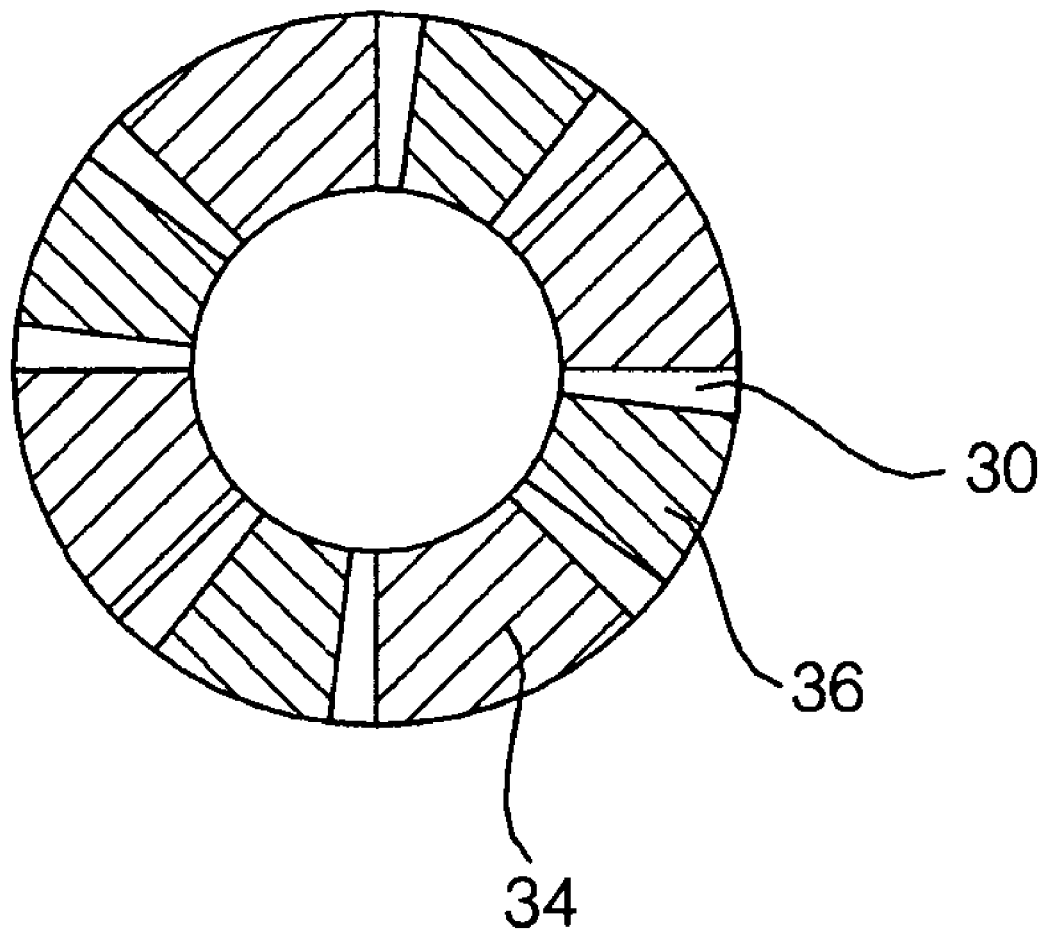
FIG. 5 is a front view of the washer according to the present invention.

Referring to FIG. 1, a pinion gear 10 of an embodiment of the present invention is centrally supported on a hinge shaft 12. Two carriers 14 are fixed to opposite end portions of the hinge shaft 12. A needle bearing 16 is interposed between the outer circumference of the hinge shaft 12 and the inner circumference of the pinion gear 10, to rotatably support the pinion gear 10. Two washers 20 are mounted between the inner surfaces of the respective carriers 14 and opposite end surfaces of the pinion gear 10.

The hinge shaft 12 is formed with an internal lubricating oil supply hole 22, to supply lubricating oil to frictional regions between the pinion gear 10 and the hinge shaft 12 and between the pinion gear 10 and the carriers 14.

As shown in FIGS. 2-5, in exemplary embodiments of the present invention, each of the washers 20 consists of a pair of washer members, which are arranged face to face to define a plurality of radially-extending oil flow holes 30 therebetween.

Specifically, the washer 20 includes the first washer member 34, the second washer member 38, and the oil flow holes 30. The first washer member 34 comes into contact, at an upper surface, thereof with one of the carrier 14 and the pinion gear 10. The first washer member 34 is formed, at a lower surface thereof, with a plurality of first stepped portions 32 each having a radially-extending concave structure. The second washer member 38 comes into contact, at a lower surface thereof, with the other one of the carrier 14 and the pinion gear 10. The second washer member 38 is formed, at an upper surface thereof, with a plurality of second stepped portions 36 each having a radially-extending convex structure. The oil flow holes 30 are formed between the first stepped portions 32 and the second stepped portions 36, to allow lubricating oil to pass through the washer 20 in a radial direction.

The first washer member 34 has an annular disk shape, so that the hinge shaft 12 penetrates through the center of the first washer member 34. The first stepped portions 32, formed at the lower surface of the first washer member 34, are arched recesses equidistantly arranged in a circumferential direction of the first washer member 34.

The second washer member 38 has an annular disk shape, so that the hinge shaft 12 penetrates through the center of the second washer member 38. The second stepped portions 36, formed at the upper surface of the second washer member 38, are arched protrusions equidistantly arranged in a circumferential direction of the second washer member 38, to be inserted into the first stepped portions 32, respectively.

Here, each of the second stepped portions 36 has a smaller arc length than each of the first stepped portions 32. Accordingly, a hole is radially defined between the first stepped portion 32 and the second stepped portion 36, thereby serving as the oil flow hole 30.

In a planetary gear set according to an exemplary embodiment of the present invention, if lubricating oil is supplied through the lubricating oil supply hole 22 formed in the hinge shaft 12, the lubricating oil is first supplied into a gap between the hinge shaft 12 and the pinion gear 10, and subsequently, moves to the opposite end surfaces of the pinion gear 10. Thereby, the lubricating oil is supplied into gaps between the pinion gear 10 and the carriers 14 through the oil flow holes 30 formed at the washers 20, to lubricate frictional regions between the pinion gear 10 and the carriers 14.

In this case, if the pinion gear 10 rotates in a direction, one of the first and second washer members 34 and 38 rotate in the same direction as the pinion gear 10. Accordingly, the first stepped portions 32 rotate relative to the second stepped portions 36, thereby acting to push the lubricating oil, which is introduced into the oil flow holes 30 between the first stepped portions 32 and the second stepped portions 36. In this way, the lubricating oil is smoothly supplied to the frictional regions.

Even when the pinion gear rotates in an opposite direction, similarly, each of the oil flow holes 30 is able to maintain a constant size.

As is apparent from the above description, embodiments of the present invention provide a washer for use in a planetary gear device. The washer consists of a pair of washer members. One of the washer members is formed with first stepped portions and the other washer member is formed with second stepped portions, so that oil flow holes are defined between the first and second stepped portions to ensure the smooth supply of lubricating oil. With this configuration, each of the oil flow holes can maintain a constant size regardless of the rotating direction of a pinion gear. Accordingly, once the lubricating oil is introduced into the oil flow holes, the washer members operate to push the introduced oil in accordance with relative rotation thereof, achieving more effective lubrication.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A washer, comprising:
   a first washer member having a plurality of first stepped portions formed at a surface thereof, each first stepped portion having a radially extending concave structure; and
   a second washer member having a plurality of second stepped portions formed at a surface thereof facing the surface of the first washer member, each second stepped portion having a radially extending convex structure to be inserted into one of the first stepped portions; and
   a plurality of oil flow holes defined between the first stepped portions and the second stepped portions for allowing lubricating oil to pass through the washer in a radial direction.

2. The washer as set forth in claim 1, wherein the first stepped portions are arched recesses equidistantly arranged at the surface of the first washer member in a circumferential direction.

3. The washer as set forth in claim 1, wherein the second stepped portions are arched protrusions equidistantly arranged at the surface of the second washer member in a circumferential direction.

4. The washer as set forth in claim 1, wherein the second stepped portion has a smaller arc length than the first stepped portion, so that the oil flow hole is defined between the first and second stepped portions.

5. A planetary gear set, comprising:
   a pinion gear;
   a hinge shaft to rotatably support the pinion gear;
   a pair of carriers fixed to opposite ends of the hinge shaft; and
   a pair of washers arranged between the respective carriers and the pinion,
   wherein each of the washers includes first and second washer members arranged face to face to define a plurality of radially-extending oil flow holes therebetween,
   the first washer member having a plurality of first stepped portions formed at a surface thereof, each first stepped portion having a radially extending concave structure; and
   the second washer member having a plurality of second stepped portions formed at a surface thereof facing the surface of the first washer member, each second stepped portion having a radially extending convex structure to be inserted into one of the first stepped portions,
   wherein a plurality of oil flow holes are defined between the first stepped portions and the second stepped portions for allowing lubricating oil to pass through the washer in a radial direction.

6. The planetary gear set as set forth in claim 5, wherein the first stepped portions are arched recesses equidistantly arranged at the surface of the first washer member in a circumferential direction.

7. The planetary gear set as set forth in claim 5, wherein the second stepped portions are arched protrusions equidistantly arranged at the surface of the second washer member in a circumferential direction.

8. The planetary gear set as set forth in claim 5, wherein the second stepped portion has a smaller arc length than the first stepped portion, so that the oil flow hole is defined between the first and second stepped portions.

* * * * *